(12) United States Patent
Rittle et al.

(10) Patent No.: US 7,613,156 B2
(45) Date of Patent: Nov. 3, 2009

(54) METHOD FOR ENERGY EFFICIENT PROSPECTIVE PEER DISCOVERY IN AN AD HOC NETWORK

(75) Inventors: Loren J. Rittle, Naperville, IL (US); Tzvetan T. Horozov, Hoffman Estates, IL (US); Nitya Narasimhan, Lake Zurich, IL (US); Venugopal Vasudevan, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 356 days.

(21) Appl. No.: 11/422,954

(22) Filed: Jun. 8, 2006

(65) Prior Publication Data

US 2007/0286136 A1 Dec. 13, 2007

(51) Int. Cl.
*H04W 4/00* (2006.01)
(52) U.S. Cl. .................... 370/338; 370/331; 455/41.2
(58) Field of Classification Search ............. 455/41.2, 455/41.3, 500; 370/254, 255, 256, 277, 311, 370/312, 338, 331
See application file for complete search history.

(56) References Cited

U.S. PATENT DOCUMENTS

| | | | |
|---|---|---|---|
| 5,047,764 A | 9/1991 | Andros et al. | |
| 5,784,368 A | 7/1998 | Weigand et al. | |
| 6,665,520 B2 | 12/2003 | Romans | |
| 6,697,649 B1 | 2/2004 | Bennett et al. | |
| 6,704,301 B2 | 3/2004 | Chari et al. | |
| 6,735,630 B1 | 5/2004 | Gelvin et al. | |
| 2002/0176391 A1 | 11/2002 | Hermann et al. | |
| 2003/0016732 A1 | 1/2003 | Miklos et al. | |
| 2003/0163579 A1 | 8/2003 | Knauerhase et al. | |
| 2004/0022225 A1 | 2/2004 | Liang et al. | |
| 2004/0029621 A1 | 2/2004 | Karaoguz et al. | |
| 2005/0128958 A1* | 6/2005 | Hamdan | 370/254 |
| 2006/0094456 A1* | 5/2006 | Rittle et al. | 455/519 |

(Continued)

FOREIGN PATENT DOCUMENTS

EP    1355223 A2    10/2003

(Continued)

OTHER PUBLICATIONS

PCT International Preliminary Report Application No. PCT/US2007/067775 - Dated December 24, 2008 - 6 pages.

(Continued)

*Primary Examiner*—Edward Urban
*Assistant Examiner*—Christian A Hannon
(74) *Attorney, Agent, or Firm*—Randi L. Karpinia

(57) ABSTRACT

Energy-efficient discovery techniques are provided for a client node to discover at least one peer provider node in an ad hoc network. For example, the client node can be configured to turn on its first ad hoc interface while in a discovery mode to establish a channel for a first time period. The client node can then transmit a first beacon to advertise its presence to other nodes within the transmission range of the client node to acquire service information from at least one of a plurality of prospective peer provider nodes within the transmission range of the client node. At least one of the prospective peer provider nodes is configured to turn on its second ad hoc interface for a second period of time to listen for beacons from other nodes. The second period of time is less than or equal to the first period of time.

32 Claims, 8 Drawing Sheets

U.S. PATENT DOCUMENTS

| | | | |
|---|---|---|---|
| 2006/0100002 A1* | 5/2006 | Luebke et al. | 455/574 |
| 2006/0142034 A1* | 6/2006 | Wentink et al. | 455/515 |
| 2006/0209715 A1* | 9/2006 | Kushalnagar et al. | 370/254 |
| 2006/0217072 A1* | 9/2006 | Poyhonen et al. | 455/67.11 |
| 2006/0239216 A1* | 10/2006 | Chen et al. | 370/310 |
| 2007/0127394 A1* | 6/2007 | Stirbu et al. | 370/254 |

FOREIGN PATENT DOCUMENTS

| | | | |
|---|---|---|---|
| EP | 1022876 B1 | | 4/2006 |
| WO | 03003610 A1 | | 1/2003 |
| WO | 2006049724 A1 | | 5/2006 |
| WO | 2007146500 A2 | | 12/2007 |
| WO | 2007146500 A3 | | 12/2007 |

OTHER PUBLICATIONS

PCT Response to Written Opinion Application No. PCT/U52007/067775 - Dated October 10, 2008-2 pages.

PCT International Search Report and Written Report Application No. PCT/US2007/067775 - Dated September 12, 2008 - 7 pages.

CML01455N - Loren J. Rittle - US Publication No. US-2006-0094456-A1.

Part 15.3: Wireless Medium Access Control (MAC) and Physical Layer (PHY) Specifications for High Rate Wireless Personal Area Networks (WPANS), 802.15.3 IEEE Standard for Information Technology - Telecommunications and Information Exchange Between Systems-Local and Metropolitan Area Networks-Specific Requirements - Dated September 29, 2003 - 19 pages.

* cited by examiner

METHOD FOR ENERGY EFFICIENT PROSPECTIVE PEER DISCOVERY IN AN AD HOC NETWORK

FIELD OF THE INVENTION

The present invention relates generally to wireless communications and more particularly to techniques for prospective peer discovery in an ad hoc network.

BACKGROUND

Ad hoc networks are self-forming networks including a number of nodes which can operate with or without any fixed infrastructure, and in some cases the ad hoc network is formed entirely of mobile nodes. An ad hoc network typically includes a number of geographically-distributed, potentially mobile nodes which are wirelessly connected to each other by one or more logical links (e.g., radio frequency communication channels). The nodes can be fixed or mobile and can communicate with each other over a wireless media with or without the support of an infrastructure-based or wired network. Logical links between these nodes can change dynamically in an arbitrary manner as existing nodes move within the ad hoc network, as new nodes join or enter the ad hoc network, or as existing nodes leave or exit the ad hoc network. A single-hop logical link can only exist between two nodes when they are within direct communication range. A multi-hop logical link can only exist between two nodes whenever a set of single-hop logical links can be used to construct a path between the nodes. Such multi-hop logical links are either instantaneously coherent (e.g. all single-hop links are present at the same time) or deferred coherent (e.g. all single-hop links are expected to be present or were present over a period of time).

Nodes can operate in at least two different modes within a network: an autonomous ad hoc mode and an infrastructure mode. In infrastructure mode, typically only one communication hop is used from a mobile node to a base station (i.e. a special node with an infrastructure connection). An autonomous ad hoc network operates in the absence or presence of infrastructure components such as a base station or Wireless Local Area Network (WLAN) access point (AP). In autonomous ad hoc mode, communications single-hop or multi-hop over logical links locally between nodes. Such nodes are sometimes referred to as peer nodes or peers in this context.

A node typically includes an ad hoc interface such as an IEEE 802.11 interface. IEEE 802.11 communication systems allow for "proximity-based" communications. For example, when two nodes are moving about, for example, in an urban area, those nodes can communicate within a range of approximately 50 meters of each other. IEEE 802.11 protocols which allow sleep cycling of the mobile nodes of the population assume that a particular mobile node can rely on the presence of other nodes or access points (APs) in close proximity at any given time. For instance, IEEE 802.11-based protocols assume that the availability of internet access points (APs) which provide nodes in the network with access to different services on the Internet. The APs provide signaling to other nodes which are traveling about the network in a sleep mode and periodically wake them up as needed. This approach is similar to approaches taken in cellular-based networks which rely on a central base station to provide this type of scheduling and discovery functionality. As such, a typical IEEE 802.11-based ad hoc interface continuously scans for other nodes in its ad hoc network, and the IEEE 802.11 interface is constantly running. Operating a node in infrastructured mode produces relatively longer battery life than autonomous ad hoc mode since the node can implement a power-save mechanism such as that specified in the IEEE 802.11b standard. Operating a mobile node in ad hoc mode can reduce the battery lifetime by a significant degree (e.g., factor of 10) when compared to infrastructured mode.

In an autonomous ad hoc network including a number of nodes, processes sometimes referred to as service discovery or peer discovery can be used so that a particular node can recognize when it encounters another node in its proximity which subscribes to the same service or a service the node is interested in, and can quickly alert the user that it is approaching another node in its area.

However, in many autonomous ad hoc networks, the density of nodes in the population is relatively low and contact between nodes is sporadic since nodes are spread out and only occasionally come within proximity of other nodes in the particular ad hoc network (e.g., a user walks around a metropolitan area with his node during the day; however, the user only sporadically runs into other nodes that they can communicate with in an autonomous ad hoc mode). As such, nodes randomly or semi-randomly come into contact with each other at different times.

In such networks, it is undesirable that these nodes have their ad hoc interface constantly running since much of the time the ad hoc interface will not be utilized and is therefore consuming power with no benefit to the user of that node. In other words, continuous scanning for other nodes can unnecessarily consume current and deplete battery power quite quickly.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
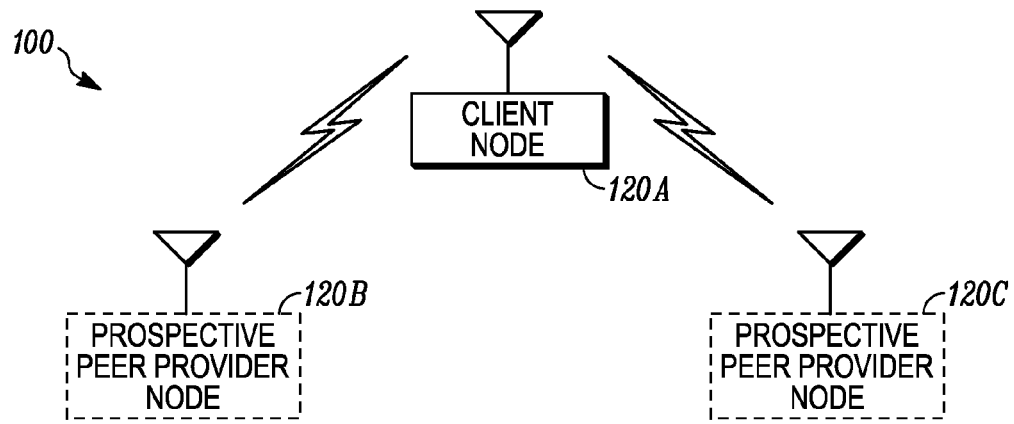
FIG. 1 is a block diagram of an exemplary ad hoc communication network.

Skilled artisans will appreciate that elements in the figures are illustrated for simplicity and clarity and have not necessarily been drawn to scale. For example, the dimensions of some of the elements in the figures can be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to energy-efficient techniques for discovering a peer node in an autonomous ad hoc network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like can be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein can be comprised of one or more conventional processors and unique stored program instructions that control the one or more processors to implement, in conjunction with certain non-processor circuits, some, most, or all of the functions for discovering a peer node in an autonomous ad hoc network as described herein. The non-processor circuits can include, but are not limited to, a radio receiver, a radio transmitter, signal drivers, clock circuits, power source circuits, and user input devices. As such, these functions can be interpreted as steps of a method for discovering a peer node in an autonomous ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

In ad hoc networks where the number of nodes in a given area is relatively low (e.g., a low density population of nodes), it is undesirable to keep the ad hoc interface continuously active since the likelihood of being proximately located with another user for communication purposes is relatively low. Likewise, it is undesirable to allow a human user of a node, if any, to directly decide when to turn on the ad hoc interface or start a service or peer discovery process. Accordingly, there is a need for improved techniques for discovering other nodes within that population as they are encountered (i.e., as the node comes within transmission range of other nodes). Moreover, there is a need in such networks, to decrease the amount of current an ad hoc interface consumes hence increasing the amount of time between recharging the battery or the practical lifetime of an exhaustible power supply.

By identifying key sources of power drain for ad hoc operation, embodiments of the present invention provides energy-efficient discovery and interaction techniques which can allow battery power to be conserved. Embodiments of he present invention provide techniques which can allow the ad hoc interface (e.g., IEEE 802.11 or IEEE 802.15 interface) to learn of another node's presence without consuming large amounts of battery resources. According to these techniques, an ad hoc interface of one node can operate in a continuous full power mode only when it is in the proximity of another node, and operates in an inactive or shutdown mode as soon as the nodes separate from each other (e.g., are outside the proximity of one another). In other words, peer discovery runs passively in the background during predetermined or per-node randomized intervals. During other intervals the ad hoc interface of a node falls back into a low duty-cycle discoverable mode so that battery power can be conserved. As such, these techniques allow the node to communicate with other nodes in its presence while reducing the amount of battery power consumed when no application-level service is required or no prospective peers are in proximity. Before describing these techniques in detail, a brief description of an exemplary autonomous ad hoc communication network (FIG. 1) and an exemplary node (FIG. 2) for use in such an exemplary autonomous ad hoc communication network is described herein.

FIG. 1 is a block diagram of an exemplary ad hoc communication network 100. The ad hoc communication network 100 comprises a plurality of nodes 120A-120C each having wireless repeater and routing capability. The nodes 120A-C can support peer-to-peer communication without the need for wired infrastructure or other networks.

The nodes 120A-120C can be wireless devices capable of transmitting and receiving packetized audio, video and/or data information. Some of the components in an exemplary node, such as a processor, transmitter, receiver and antenna, are described below in FIG. 2. A node can be stationary or mobile at any particular instant in time, and can include devices configured to communicate through a wireless channel. A node can be embodied as any of a number of types of devices including but not limited to a personal computer (PC) having an external or internal wireless modem, a PC card, a compact flash, a wireless communication device such as a cellular telephone or a personal digital assistant (PDA). In one implementation, the wireless device comprises a mobile telephone which can also be called a mobile station (MS), mobile equipment (ME) or user equipment (UE).

The nodes 120A-120C can communicate information packets over wireless carrier frequencies, each of which includes one or more wireless communication channels depending on the multiple access scheme utilized in the network 100.

The nodes 120A-C can also communicate with infrastructure components, such as APs, which are typically, but not necessarily required to be, coupled to a wired network (not shown) and can provide one or more sources of audio, video and/or data information. The APs can be a cellular base station, a wireless access point that complies with the IEEE 802.11 Standard or other wireless local area network (WLAN) Standards, a Bluetooth access point, or the like.

The ad hoc communication network 100 can implement routing intelligence, which is typically distributed among nodes 120A-120C to help improve overall network performance. In the ad hoc network 100, communications to or from nodes 120A-120C can "hop" through each other to reach other nodes 120A-120C in the network. In other words, nodes in close proximity can receive transmissions from nearby nodes utilizing the ad hoc air interface and relay these transmissions to other nodes, including access points or nodes with links to other wired or wireless networks.

When access to a wired network is desired, communications from nodes 120A-C can hop to a WLAN AP. Although not shown in FIG. 1, it will be appreciated by those of ordinary skill in the art that the nodes 120A-120C, can also communicate information packets with a wide area network (WAN) such as a cellular-based network (not shown) over wireless carrier frequencies, each of which includes one or more wireless communication channels depending on the multiple access scheme utilized in the cellular-based network.

Figure 2:
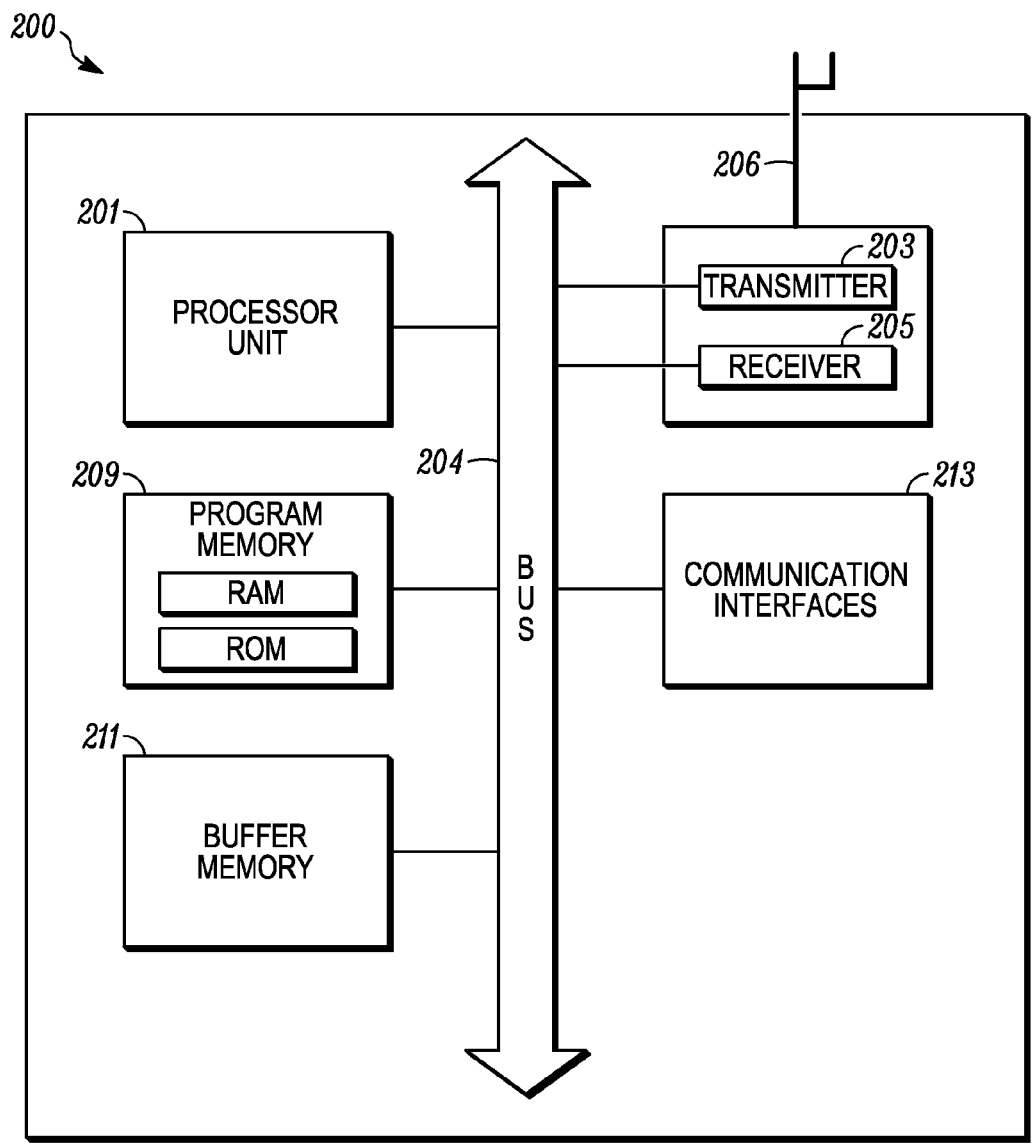
FIG. 2 is a block diagram of an exemplary node.

FIG. 2 is a block diagram of an exemplary node 200. The node 200 comprises a processor 201, a transceiver 202 including a transmitter circuitry 203 and a receiver circuitry 205, an antenna 206, a program memory 209 for storing operating instructions that are executed by the processor 201, a buffer memory 211, and one or more communication interfaces 213. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular electronic function. Alternatively, the node 200 can comprise a collection of appropriately interconnected units or devices, wherein such units or devices perform functions that are equivalent to the functions performed by the elements of the node 200.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 201 has one or more of its functions performed by a state machine or logic circuitry, the memory 209 containing the corresponding operational instructions can be embedded within the state machine or logic circuitry. The operations performed by the processor 201 and the other elements of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include appropriate, conventional circuitry to enable digital or analog transmissions over a wireless communication channel. The transmitter circuitry 203 and the receiver circuitry 205 can operate over an ad hoc networking air interface (e.g., Bluetooth, IEEE 802.11, IEEE 802.15, and the like).

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. One of ordinary skill in the art will recognize that most, if not all, of the functions of the transmitter circuitry 203 and/or the receiver circuitry 205 can be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving RF signals from at least one frequency band and optionally multiple frequency bands, if the communications with the proximate device are in a frequency band other than that of the network communications. The receiver circuitry 205 can optionally comprise a first receiver and a second receiver, or one receiver capable of receiving in two or more bands. The receiver 205, depending on the mode of operation, can be tuned to receive, for example, Bluetooth or wireless local area network (WLAN), such as IEEE 802.11, communication signals. The transceiver 202 includes at least one set of transmitter circuitry 203. The at least one transmitter 203 can be capable of transmitting to multiple devices potentially in multiple frequency bands.

The antenna 206 comprises any known or developed structure for radiating and receiving electromagnetic energy in the frequency range containing the wireless carrier frequencies.

The buffer memory 211 can be any form of volatile memory, such as RAM, and is used for temporarily storing received information packets in accordance with the present invention.

Figure 3:
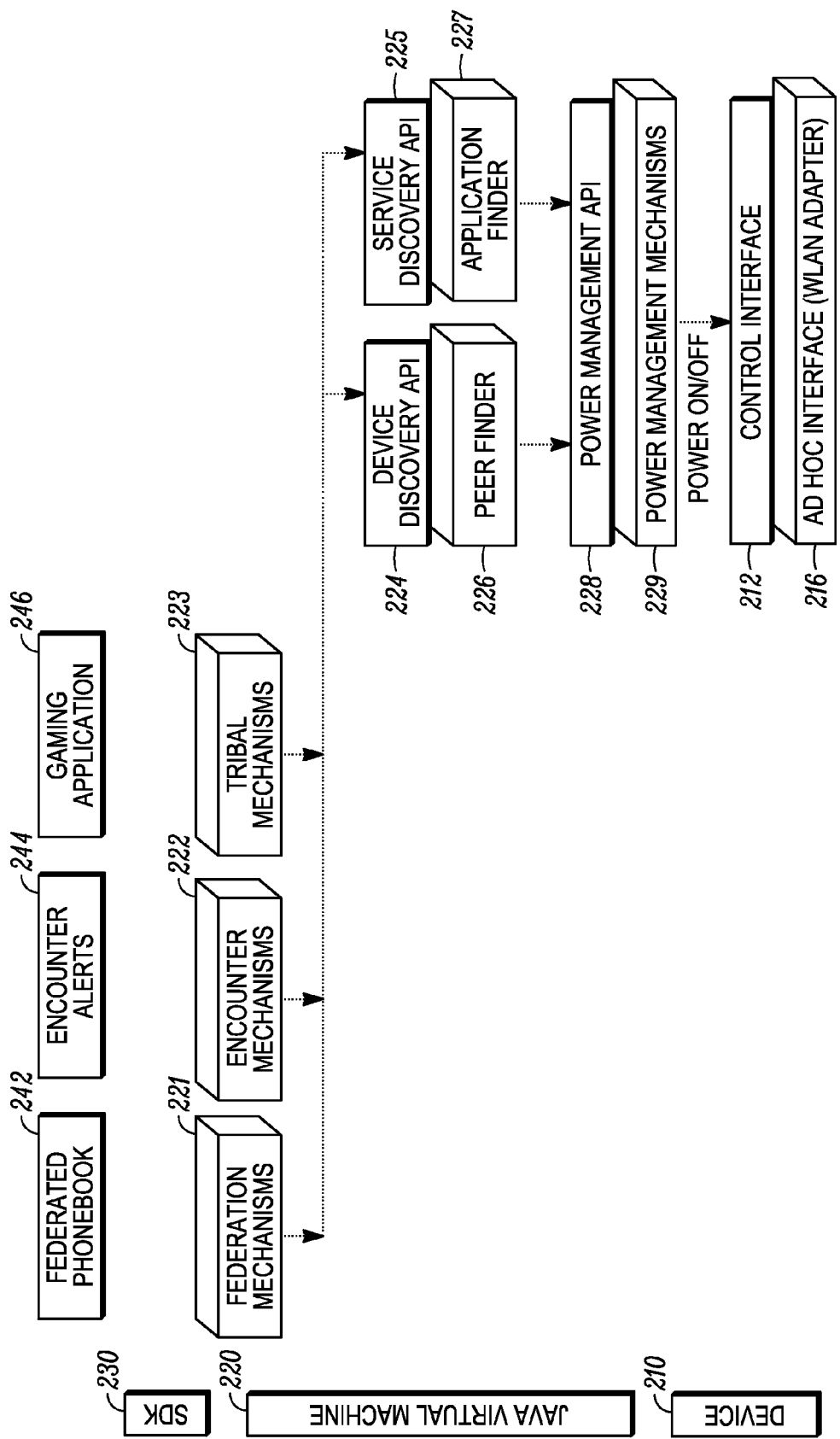
FIG. 3 shows a framework for developing applications on a node that supports an ad hoc networking interface according to one exemplary embodiment.

FIG. 3 shows a framework for developing applications on a node that supports an ad hoc network interface, according to one exemplary embodiment. The framework is partitioned into a number of software layers 210 through 230.

The physical (hardware) layer 210 includes a control interface 212 and an ad hoc network interface 216 (e.g., wireless local area network (WLAN) adapter). The control interface 212 provides the methods required to power up or power down the network interface, as well as methods to query the interface for state information (e.g., is the network idle or active) and configure the interface as required (e.g., switch to ad hoc mode, set a service set identifier (SSID) or security parameters). The control interface, for example, can be mapped onto device-specific control interfaces, or can exploit a more generic control interface as provided by /proc on the Linux operating system.

The JAVA virtual machine (JVM) layer 220 includes one or more modules and Application Programming Interfaces (APIs). The modules in the JVM layer 220 can include, for example, a peer finder module 226, and an application finder module 227, and a power management module 229. The APIs can include, for example, a device discovery API 224, a service discovery API 225, and a power management API 228. The device discovery API 224 allows applications on the node to initiate a peer discovery operation and be notified of the identities (Internet Protocol (IP) addresses) of devices that are currently in the device's vicinity. The service discovery API 225 allows applications on the node to initiate a service discovery operation and be notified of the services available on nearby devices in aggregate, or on a per-device basis. The device and service discovery modules update this device's transmitted beacon with the relevant device IP address and service information, and also extract this information from detected beacons transmitted by their peers. The results are accumulated over each discovery period ($Y_{max}$) and returned to the requesting application and any registered nodes. The power management API 228 is the interface from the JVM that enables applications to request tuning of the power management parameters (e.g., duration for power-on and power-off). In turn, the power management module 229 computes and establishes power management parameters that reflect the collective requests of all resident applications.

The software developer's kit (SDK) layer 230 provides one or more APIs for use by application programmers when writing an application and interfacing it to the JVM 220. Applications can be developed to directly use the lower-level interfaces for discovery 224, 225 and power management 228. Alternatively, they can use application programming interfaces 221, 222, 223 that provide default behaviors for specific classes of applications 242, 244, 246.

Federation applications 242 reflect short-term synchronous queries from the application (e.g., for immediate data-sharing) while encounter applications 244 reflect long-term asynchronous queries (e.g., for alerts to future peer discovery). Unlike federation or encounter applications, tribal applications 246 reflect interactive sessions of longer duration (e.g., a multiplayer game or chat). Each class of applications thus requires a different power management strategy for efficient operation, that can be provided by the related federation, encounter and tribal modules.

In the following description, a "provider" node is a node that can provide services or content to peers, and a "client" node is a node that is searching provider nodes of a specific service or content. A single node can be both a client node and a provider node depending on the context of its different interactions. A discovery process involves enabling a client node to locate a nearby provider node that can satisfy a pending user or application request.

Overview Energy-efficient Discovery Techniques

When a particular client node enters an area and needs a particular service, it is desirable to be able to quickly discover which peer nodes are within its transmission range and which services those peer nodes can provide. This way, a particular client node seeking a particular service can determine quickly whether or not the service is available in its area via other nodes in its proximity. Network activity consumes battery power. For energy efficiency, it is desirable to minimize the network activity required for discovery at both client nodes and provider nodes.

Embodiments of the present invention provide push-based prospective peer discovery techniques for use in an ad hoc network. Provider nodes transmit advertisement messages to periodically advertise or announce their presence and related service information on the network. These advertisement messages use application-level beacons (as opposed to Media Access Control (MAC)-level beacons) that contain the relevant addressing and service information. Client nodes can remain off the network (e.g., in an inactive state) until an application/user request for discovery is made. Potential client nodes can discover the provider node by listening for a duration or finite interval (e.g., typically equal to one period of the provider node's advertising duty cycle) to detect the provider node.

Because provider nodes can potentially service many client nodes (i.e., are involved in more interactions and communication than the average client node), it is desirable that provider nodes have a relatively long battery life. The disclosed discovery techniques favor provider nodes over client nodes by making the client node responsible for a higher percentage of the energy burden for discovery since the client node ultimately benefits from the discovery process. By contrast, provider nodes are rewarded for their efforts with a reduced energy burden.

Deploying an ad hoc networking interface in idle mode (e.g., where no useful transmission/reception work is done) unnecessarily wastes battery power. Ideally, the ad hoc interface should be turned off during these idle intervals in order to conserve power. However, if the ad hoc interface is powered-off, then the node cannot be opportunistically "discovered" by a peer. At the same time, if the ad hoc interface is kept powered-on, the node risks substantial power depletion without benefit when there are no active peer nodes in the vicinity. The disclosed push-based prospective peer discovery techniques strike an appropriate balance between the always-on and the always-off modes of operation to prevent power usage during idle periods. The disclosed techniques can provide energy savings while automatically and passively running absent any user interaction.

Exemplary Energy-Efficient Discovery Techniques

According to one embodiment of the present invention, energy-efficient discovery techniques are provided for a client node to discover at least one peer provider node in an autonomous ad hoc network. According to these techniques, a first ad hoc interface in the client node can be turned on while in a discovery mode to establish a channel for a first "discovery" time period ($Y_{max}$). Typically, during this first time period, channel beacons would be periodically transmitted by the client node.

A second ad hoc interface of the prospective peer provider node(s) can be turned on for a second time period ($\alpha$) to listen for channel beacons or other indications of an established channel from other potential client nodes. In some implementations, the second ad hoc interface would be turned off as soon as it was determined that no established channel was present. The second ad hoc interface can be turned on, for example, at regular, yet unsynchronized with respects to the rest of the node population, predetermined time intervals. It can also vary based on the related node's current application set (further broken down into varying based on the set loaded upon the device or the set currently running). It can also vary based on the current operation mode of the applications currently running on the related node. The second time period ($\alpha$) is less than or equal to the first period of time. At least one of the prospective peer provider nodes (and possibly multiple prospective peer provider nodes) can transmit its own application (service) level beacon at the beginning of the second time period ($\alpha$) to advertise services which the prospective peer provider node can provide to other potential client nodes within the transmission range of the prospective peer provider node.

The prospective peer provider node can transmit a first beacon comprising a first field indicating the second time period ($\alpha$) the prospective peer provider node will stay on the channel or keep the second ad hoc interface on for, and a second field indicating a service the prospective peer provider node is providing. The second time period is of sufficient duration to ensure that a client node within the transmission range of the prospective peer provider node can detect and respond to the first beacon, and that, if a response message is transmitted by a client node, the prospective peer provider node will detect a response message within the second time period. During the second time period, the prospective peer provider node also listens for a response message from at least one client node within the transmission range of the prospective peer provider node. This allows the client node to acquire service information and service from prospective peer provider node(s) within the transmission range of the client node. The client node turns off the first ad hoc interface and enters sleep mode if the client node does not receive a first beacon from a prospective peer provider node at the end of the first time period. The beacon from the prospective peer node comprises a service extension field comprising a list of services that are currently running on the prospective peer provider node or that the node prospective peer provider node is capable of running. This allows the prospective peer provider nodes to communicate information associated with a service potentially requested by the client node. Once a prospective peer provider node has communicated the information associated with the service requested by the client node, the prospective peer provider node turns off the second ad hoc interface. Moreover, if any prospective peer provider node does not receive a response message from the client node, then it turns off its second ad hoc interface at the end of the second time period ($\alpha$), and remains off for a third time period ($\beta$). Thus, the duration of the second time period ($\alpha$) and the duration of the third time period ($\beta$) define a duty cycle (Y) for the ad hoc interface of a particular prospective peer provider node.

The client node can analyze information in the beacon from the prospective peer provider node to determine if the prospective peer provider node offers (or is capable of offering) the service the client node is requesting so the client node can then transmit a response message to the prospective peer provider node so that the prospective peer provider node keeps its second ad hoc interface on for an additional time period (e.g., more time in addition to the second time period).

A specific exemplary implementation of these techniques will now be described with reference to FIG. 4.

Figure 4:
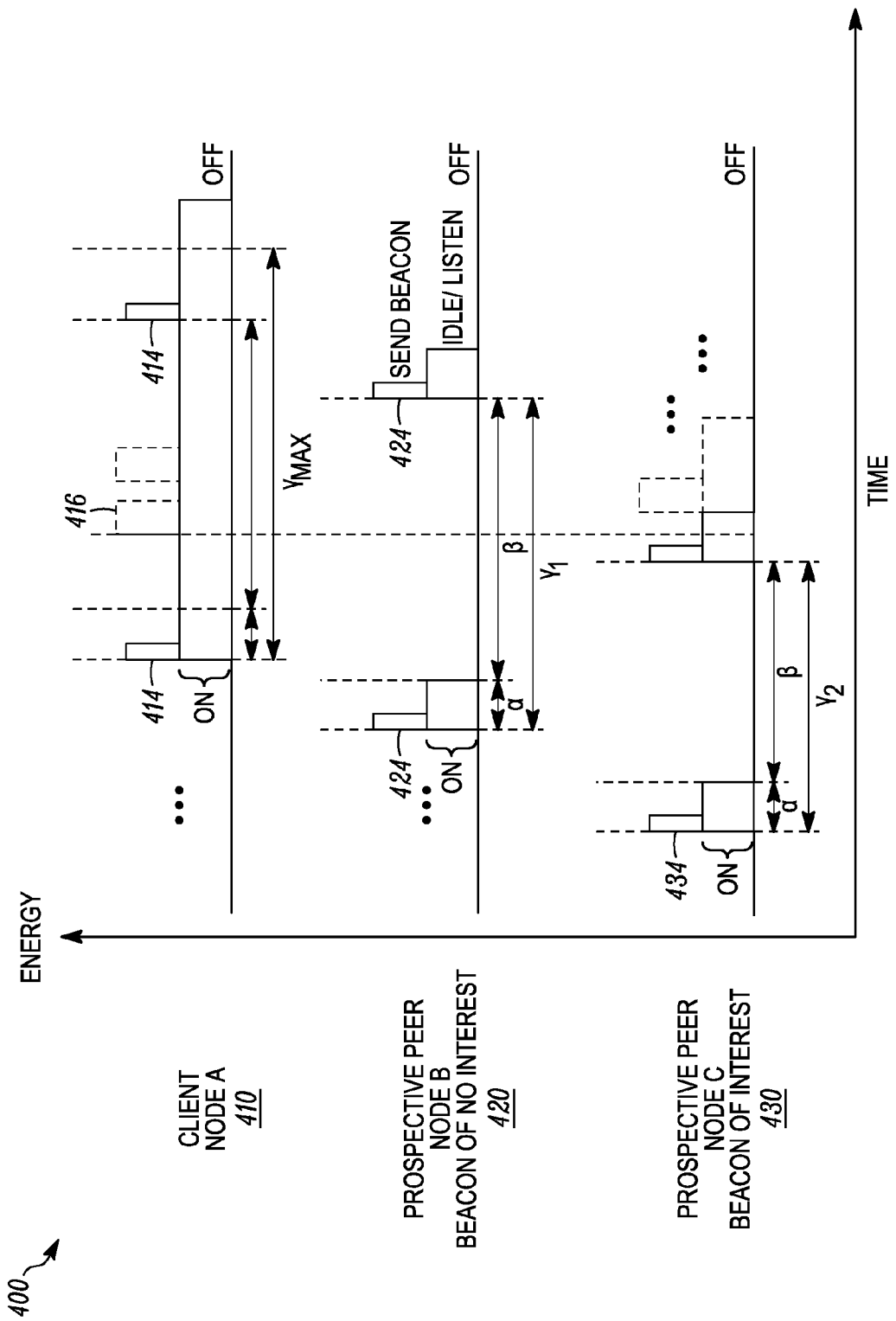
FIG. 4 shows energy use timing diagrams for a client node and prospective peer nodes which illustrate energy-efficient limited time beacon techniques for prospective peer (or service) discovery in an autonomous ad hoc network in accordance with some embodiments of the invention.

FIG. 4 shows energy use timing diagrams 410 420, 430 for a client node and one or more prospective peer nodes, respectively, which illustrate energy-efficient limited time beacon techniques 400 for prospective peer (or service) discovery in an exemplary ad hoc network in accordance with some embodiments of the invention. In the following example, it is assumed that the network comprises three node A, B, C; however, the population can also comprise fewer or more nodes in actual implementations in accordance with embodiments of the present invention. In this particular example, it can be assumed that node A is currently running an application or program and would like to discover service information from a peer node in its vicinity.

In FIG. 4, a corresponding timing diagram 410, 420, 430 is shown for each node A, B, C. Specifically, timing diagram 410 is associated with client node A, timing diagram 420 is associated with prospective peer node B, and timing diagram 430 is associated with prospective peer node C. In FIG. 4, the vertical axis represents the state of a particular node and thus an approximation of the energy being used by a particular node and the horizontal axis represents time. The timing diagrams 410, 420, 430 each show energy being consumed by a particular one of the nodes A, B, C as function of time. When the ad hoc (e.g., IEEE 802.11 or IEEE 802.15) interface is completely turned off and is utilizing substantially no energy the vertical axis for the node is shown at its baseline or "OFF."

As shown in timing diagram 410, when node A attempts to acquire information from other nodes in its proximity, node A turns on ("ON") its ad hoc interface at the leading edge of a first "discover" time period ($Y_{max}$) to establish a channel. Because node A is trying to learn the information from other users, node A will keep the channel (its ad hoc interface) turned on (e.g., active) for the discovery time period ($Y_{max}$). The first beacon 414 is coincidentally shown to be transmitted at the leading edge of the first time period. This is shown because all client nodes can be a prospective peer node concurrently. A client node can use a beacon 414 to advertise the start of the discovery time period ($Y_{max}$). However, this is not required. The client node need only establish an ad hoc channel to allow other prospective peer nodes to communicate with it during the first discovery time period ($Y_{max}$).

This beacon 414 can be implemented, for example, as a User Datagram Protocol (UDP) datagram, IEEE 802.11 frame or even tied to the RF-level beacon process. The first beacon 414 advertises the first discovery time period ($Y_{max}$) to other nodes (nodes B and C in this example) during which node A will keep the channel turned on. Among other information, the beacon 414 also includes an alpha ($\alpha$) parameter which specifies a first time period which the node keeps its ad hoc interface ON for, a beta ($\beta$) parameter which specifies a second time period following the first time period which the node turns its ad hoc interface OFF for, and any registered service advertisement payload. Each node selects an alpha ($\alpha$) value and a beta ($\beta$) value that sum up to less than the first discovery time period ($Y_{max}$). The sum of alpha ($\alpha$) and beta ($\beta$) represents the expected time until the next beacon will be transmitted from this node. For the stability reasons, the node should transmit a beacon at least once every the first discovery time period ($Y_{max}$).

The node A listens for the first discovery time period ($Y_{max}$) for beacons from any prospective peer nodes that might be in its vicinity. The first discovery time period ($Y_{max}$) is a system-wide constant that is known by all nodes which utilize this particular protocol. The first discovery time period ($Y_{max}$) is the amount of time that a particular node must turn on and listen for prospective service beacons, and after one the first discovery time period ($Y_{max}$), a client node A is guaranteed to have heard a beacon from every nearby neighbor.

While the channel is turned on during the first discovery time period ($Y_{max}$), either node B or node C can begin communicating with node A. In this example, node C begins communicating with node A. It should be noted that if no other node attempted to communicate with node A during the first discovery time period ($Y_{max}$), then at the end of the first discovery time period ($Y_{max}$) node A shuts down its ad hoc interface and returns to sleep mode during which the ad hoc interface is completely shut off. In other words, the ad hoc interface is turned on for a certain minimal amount of time that is adequate to advertise the presence of node A to other nodes (such as node B and node C) which might be in the vicinity or transmission range of node A, and to receive a response beacon from a prospective peer node.

If one of the neighbor nodes in proximity of node A responds with a beacon of its own, then node A can receive that beacon, analyze the information presented in that beacon, and determine whether or not one of the other nodes is providing a service or offering a service which node A has interest in.

For example, in FIG. 4, node C responds with a beacon 434, and it is assumed that node A is interested in the service being offered by node C (as indicated by the dashed line rectangle 416 which lets node C knows to keep its channel (its ad hoc interface) turned on for more than a minimum second time period ($\alpha$)). Thereafter, the node A and node C communicate with each other, exchange the necessary information, and once they are done, node C shuts off its ad hoc interface (as indicated by the dashed line rectangle 436) to end the communication or tear down the communication channel between node C and node A.

By contrast, node B sends information in its application service level beacon 424 which node A is not interested in. The application service level beacon 424 can be sent whenever node B wakes up or receives a beacon from another node in its proximity. The application service level beacon 424 can include, for example, the minimum second time period ($\alpha$) that node B will leave the channel (its ad hoc interface) "ON" so that it can receive responses to the beacon that it sent (e.g., the amount of time that node B will listen for possible communication partners or other units that are interested in the services node B is offering), a third time period ($\beta$) after which node B will turn its ad hoc interface "OFF," and the services being offered by node B. As shown in the graph 420 corresponding to node B, node B does not receive a response 416 from node A and, therefore, only keeps its ad hoc interface on for a second minimum time period ($\alpha$) in the graph 420 corresponding to node B. This second minimum time period ($\alpha$) corresponds to an idle or listening mode during which node B will keep the channel turned on in order to determine whether or not a prospective client node is interested in the service being offered by node B. This second minimum time period ($\alpha$) is defined to preserve battery life and prevent battery drain in node B. Node B turns off its ad hoc interface for the third time period ($\beta$) if node B does not receive another beacon in response to its beacon 424.

Notably, by using these peer discovery techniques, the client node A which is looking for a service pays the higher cost since it stays awake for the entire first discovery time period ($Y_{max}$) and therefore must consume more of their own battery resources. Client node A consumes much more energy than prospective peer nodes B,C since client node A is on for a much longer period while it is listening. (The amount of energy consumed over first discovery time period ($Y_{max}$) is essentially the area under the curve and is substantially for node A than for prospective peer nodes B, C.) Thus, because node A is the particular node that is looking for service, node A pays more of the cost in terms of energy expended because it is seeking the service, whereas node B and node C are merely advertising services and, therefore, can leave their ad hoc interfaces off for a greater percentage of the time and expend less battery resources.

Although not shown in FIG. 4, it will be appreciated by those of ordinary skill in the art that some form of forward error correction or transmission repetition can need to be applied to beacons 414, 424 and 434. An application request that goes unfulfilled during any particular first discovery time period ($Y_{max}$) can be restarted using either an immediate retry scheme or an exponential backoff timer-based retry.

Adjustable Duty Cycle for the Ad Hoc Interface of Each Node

As noted above, each node can set its own duty cycle based on alpha ($\alpha$) and beta ($\beta$) and advertise that particular duty cycle to its neighbors. The parameter alpha ($\alpha$) specifies how long the node will listen, i.e., how long the node will turn its ad hoc interface on, and beta ($\beta$) is the amount of time that the interface is off or "down". The values of the time period alpha ($\alpha$) and the time period ($\beta$) can change from time to time since each node has the ability to individually tune values of time period ($\alpha$) and time period ($\beta$) which are used depending on the particular implementation of the network that a user is in.

For instance, in one implementation, each prospective peer provider node can independently set the duration of its second time period ($\alpha$) and the duration of its third time period ($\beta$) based on the particular service(s) being offered by the particular node. The durations of these time periods are variable and can be set independently by each prospective peer provider node.

In another implementation, the duration of the second time period ($\alpha$) can be adjusted based on the particular radio protocol being used, and the duration of the third time period ($\beta$) can be adjusted based on the real time requirements of the particular service(s) being offered by the particular node.

For client nodes, the values chosen for alpha ($\alpha$) and beta ($\beta$) can be tweaked depending on the type of application that a particular client node is looking for. In other words, the window for which the client node stays awake can be tuned by that client node up to the first discovery time period ($Y_{max}$) (the system-wide constant that is known to all nodes utilizing this protocol). If a client node stays awake for this first discovery time period ($Y_{max}$), the client node is guaranteed that nodes in its vicinity operating in accordance with this particular protocol have received its service request.

For peer provider nodes, the values of alpha ($\alpha$) and beta ($\beta$) can be determined by the services that are running on the node. Y is the total duty cycle for a particular peer provider node and is equal to the sum of alpha ($\alpha$) plus beta ($\beta$) for that peer provider node. For a particular peer provider node, the value of Y can vary based on the particular values of alpha ($\alpha$) and beta ($\beta$). In all cases, the value of Y has an upper bound ($Y_{max}$) which specifies the maximum value that the value of Y can take. Thus, different nodes within the population can have a different alpha ($\alpha$) and beta ($\beta$) value depending on the particular service that they offer.

Thus, the alpha ($\alpha$) parameter can be tuned based on a number of different variables. The value of alpha ($\alpha$) is generally dictated by the characteristics of the particular node protocol being used; for example, an IEEE 802.11 protocol would utilize one value of alpha ($\alpha$). The value chosen for alpha ($\alpha$) in a particular scenario can also depend on factors such as round trip delay in the hardware platform. It is desirable to keep alpha ($\alpha$) as small as possible since this helps conserve energy since the higher the value of alpha ($\alpha$), then the higher the cost is in terms of battery resources to the node.

However, the node will also be more likely to be able to offer services to other nodes in the network with the higher value of alpha ($\alpha$).

The factors or parameters that help determine the value of beta ($\beta$) include constraints in the node itself. The value of beta ($\beta$) can be determined, for example, based on the real time requirements of the application service that the particular node is offering (e.g., is the application delay tolerant, how many different applications are running in a particular instance that the node will potentially need to send out responses to, and the relative importance of the data being transmitted). The amount of power which remains on the node is also another factor that can influence the value of beta ($\beta$) so that as the battery drains the value of beta ($\beta$) would increase to conserve the remaining battery power, i.e., utilize less power as battery capacity decreases. The value of beta ($\beta$) can be determined based on the minimum initial request service time required for all active applications running on the related node. The value of beta ($\beta$) can be determined based on the minimum initial request service time required by all applications loaded on the related node.

For instance, referring back to FIG. 3, FIG. 3 illustrates three examples of different types of applications called a federated phone book application 242, encounter alerts application 244, and a gaming application (e.g., multi-player Othello game) 246.

The federated phone book application 242 is a data-sharing application to which a query is sent for a piece of data and a response is sent back to the client node A. In this situation, the client node A making the request for the data would send the request for one full $Y_{max}$ duration and if any neighbor nodes are within the proximity of the client node A, then those neighbor nodes can grab the piece of data that is requested, send it, and then fall back asleep immediately. As such, in this context the value of alpha ($\alpha$) would be relatively small and the value of beta ($\beta$) would be relatively large. In other words, the neighbor node only needs to stay on long enough to receive the request, and send a response, and can then immediately go to sleep and does not need to stay on for any extra period of time.

By contrast, in an application called encounter alerts 244, the user of node A, for example, could enter a request into the node to determine when a user of a particular node is in their vicinity so they can communicate with them (e.g., client node A would be looking around periodically for prospective peer node C). In this scenario, alpha ($\alpha$) can be tuned over time. For example, if node A would like to find node B by Friday and it is currently Monday, the value of alpha ($\alpha$) can change over that time period until node A contacts node B. For example, on Monday, the duration of alpha ($\alpha$) can be relatively short, but if node B is still not found, then as the week progresses, the duration of alpha ($\alpha$) could be increased since it has become more urgent to find node B. This way as the deadline approaches, the node A would stay on or active longer advertising their presence to increase the likelihood of reaching node B.

Advertisement Packet Data Structure

According to another embodiment of the present invention, techniques are provided for choosing between two prospective beaconers who offer to provide a service to a requesting node (e.g., resolving a conflict when two prospective peer provider nodes respond with a first beacon). According to these techniques, when the client node receives a first beacon from a first prospective peer provider node and a second prospective peer provider node. In addition to a service extension field, the second beacon can further comprise a first field specifying a duration of the second time period ($\alpha$) during which the second ad hoc interface will be on and a duration of the third time period ($\beta$) during which the second ad hoc interface will be off, a MAC beacon field which specifies the IEEE 802.11 MAC beacon; an IP extension field which specifies the IP address of the particular node that is transmitting the second beacon; and a second field comprising a number of neighbor nodes a particular prospective peer provider node has seen recently within a particular time period. The client node evaluates each of the second beacons, and chooses either the first prospective peer provider node or the second prospective peer provider node based on the fields specified in each of the second beacons. One implementation of these fields will now be described below with reference to FIG. 5.

Figure 5:
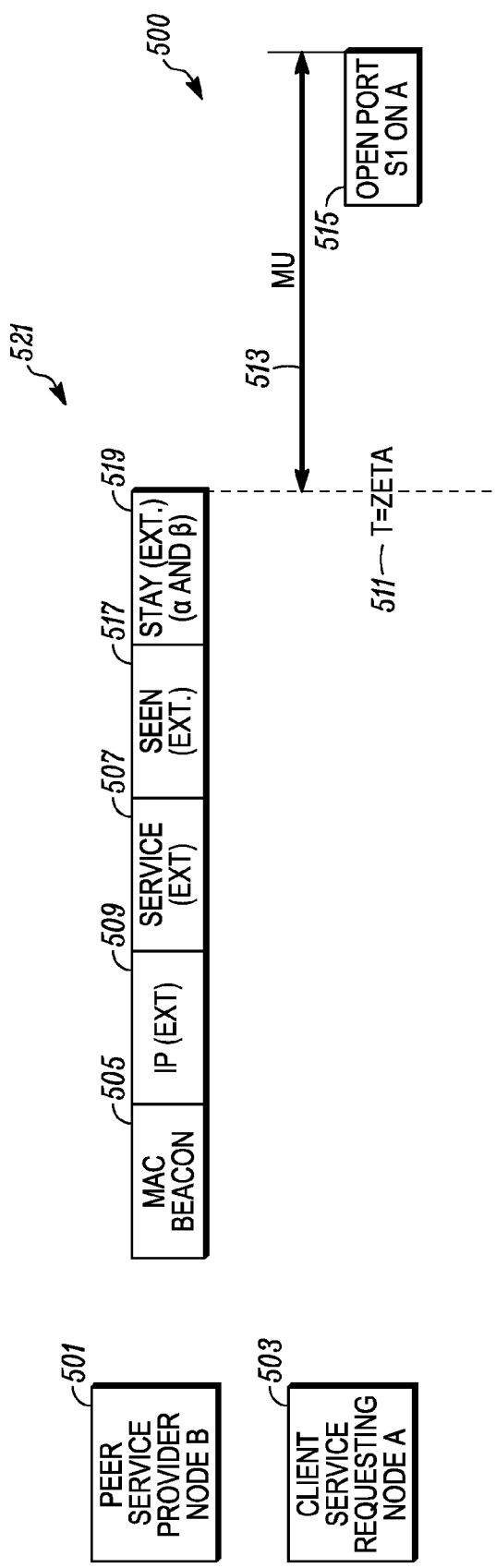
FIG. 5 illustrates a physical layer packet transmitted in a beacon signal from a peer service node to a requesting client node.

FIG. 5 illustrates a physical layer advertisement packet 521 corresponding to a beacon from a peer node B 501 to a client node 503. In this example, peer node B 501 is a service provider node which provides a requested service, and client node A 503 is a service requesting node.

Each node, including the prospective peer provider node 501, transmits an advertisement packet 521 to advertise the services that node can potentially provide, and describes what the particular node is capable of. The advertisement packet 521 comprises a MAC beacon field 505 which specifies an IEEE 802.11 MAC beacon of the node, an IP extension field 509 which specified the IP address of the particular node that is transmitting the advertisement packet 521, a service extension field 507 which contains a list of services that are currently running on the node or that the node is capable of running, a seen extension field 517 which describes how many neighbors a particular node has seen recently within a particular time period and allows a node to describe the density of nodes which are presently running a particular protocol, and a stay extension field 519 which includes the parameters alpha ($\alpha$) and beta ($\beta$) for that prospective peer provider node 501. The service extension field 507 allows a service requesting node A 503 to initiate a service against the prospective peer provider node 501 if they know that the prospective peer provider node 501 has a service running or could potentially offer it even if it is not currently running.

Upon receipt of a beacon 521 at time 511 from he prospective peer provider node 501 the client node 503 decides whether the service being offered by node 501 matches its application requirements. If so, before timer 513 (related to the alpha ($\alpha$) parameter specified in the stay extension field 519 of the received beacon 521) expires, the prospective peer provider node 501 opens a service port SI on the prospective peer provider node 501. For instance, in one implementation, a Transmission Control Protocol (TCP) SYN packet 515 would be sent.

Figure 6:
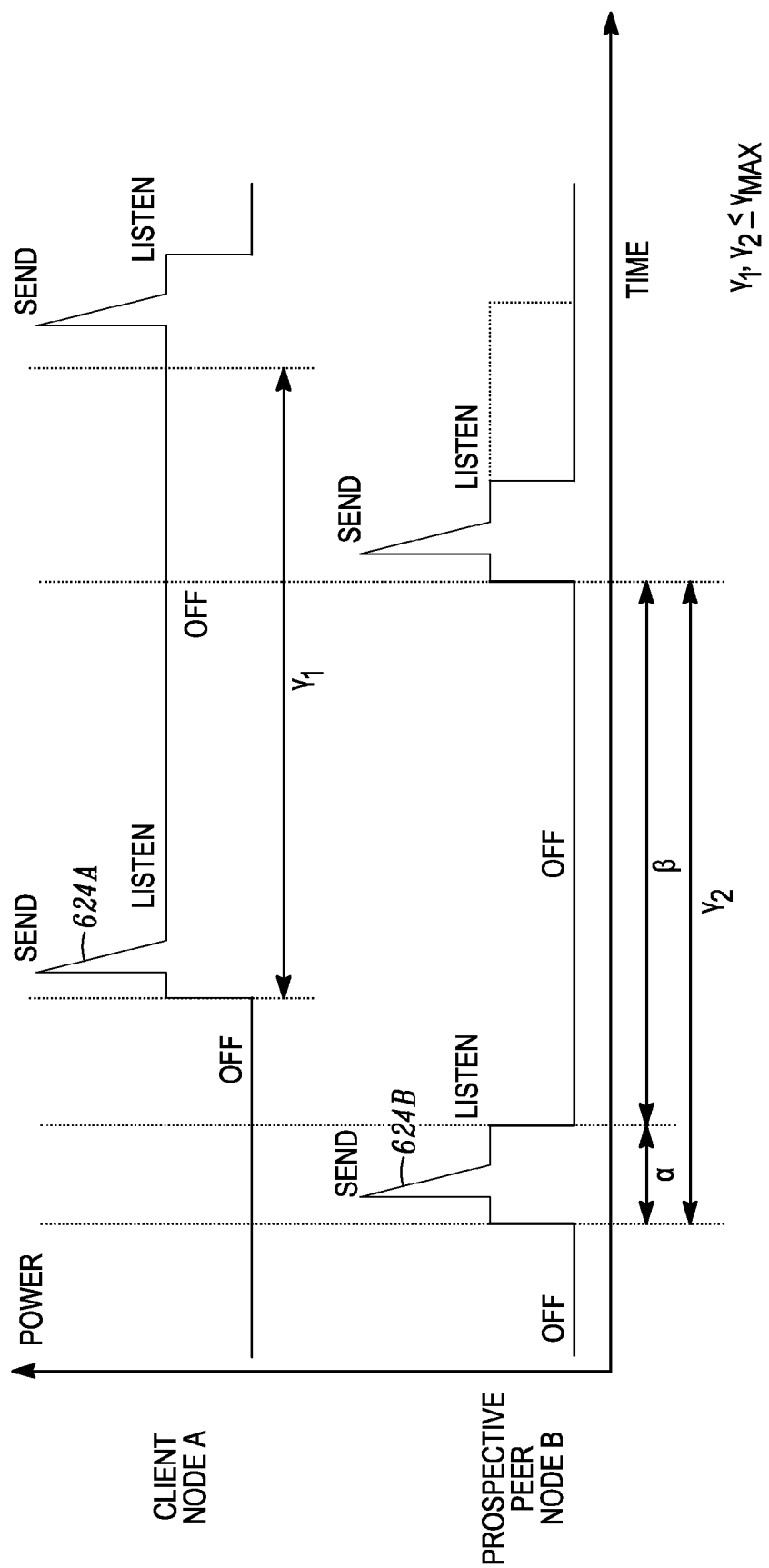
FIG. 6 is a timing diagram demonstrating the unsynchronized nature of beacons in the ad hoc network.

FIG. 6 is a timing diagram demonstrating the unsynchronized nature of beacons in the ad hoc network.

As shown in FIG. 6, a client node A keeps its ad hoc interface on for a relatively long time period (Y1) during which it sends beacon 624A and listens for response beacons from prospective peer node(s).

By contrast, a prospective peer node B keeps its ad hoc interface on for a time period ($\alpha$) during which it sends beacon 624B and listens for beacons from potential client node(s), and then turns its ad hoc interface off for a time period ($\beta$). The sum of time periods ($\alpha+\beta$) is equal to the time period (Y2), and in this example time period (Y1) is equal to time period (Y2); however, the time period (Y1) and time period (Y2) are not synchronized in time. For example, the leading edge of time period (Y1) where the ad hoc interface of the client node A turns on, does not occur at the same time as the leading edge (Y2) where the ad hoc interface of the prospective peer node B turns on. Similarly, the falling edge of time period (Y1) where the ad hoc interface of the client node A turns off, does not occur at the same time as the falling edge where the ad hoc interface of the prospective peer node B turns off (at the end of the time period ($\alpha$)).

In a typical IEEE 802.11 network in IBSS mode, nodes are not synchronized since nodes are assumed not to have the benefit of a central controller such as an internet access point or base station. However, many nodes have access both to the cellular network and the ad hoc network. If particular nodes subscribe to the same service provider for its cellular service, the nodes can use the synchronization that is provided via the cellular network in the context of the ad hoc network to achieve timing synchronization that would otherwise not be possible. For example, in a time division multiple access (TDMA) system all base stations are synchronized in time to within milliseconds (using global positioning system (GPS) satellites), and every cell in a network transmits a universal time constant that is the same across cells in the network. This universal time constant is transmitted to all nodes in the network as part of the network protocol.

In idle mode, a client node A still consumes substantial amount of energy in comparison to peer nodes. According to another embodiment of the present invention, techniques are provided in which the nodes in the ad hoc network are time synchronized based on a time constant provided, for example, from a cellular network or service. Synchronizing nodes operating in an ad hoc mode can allow the nodes to turn their ad hoc interface "on" and "off" at predefined intervals to help reduce the energy consumption of the client nodes.

Figure 7:
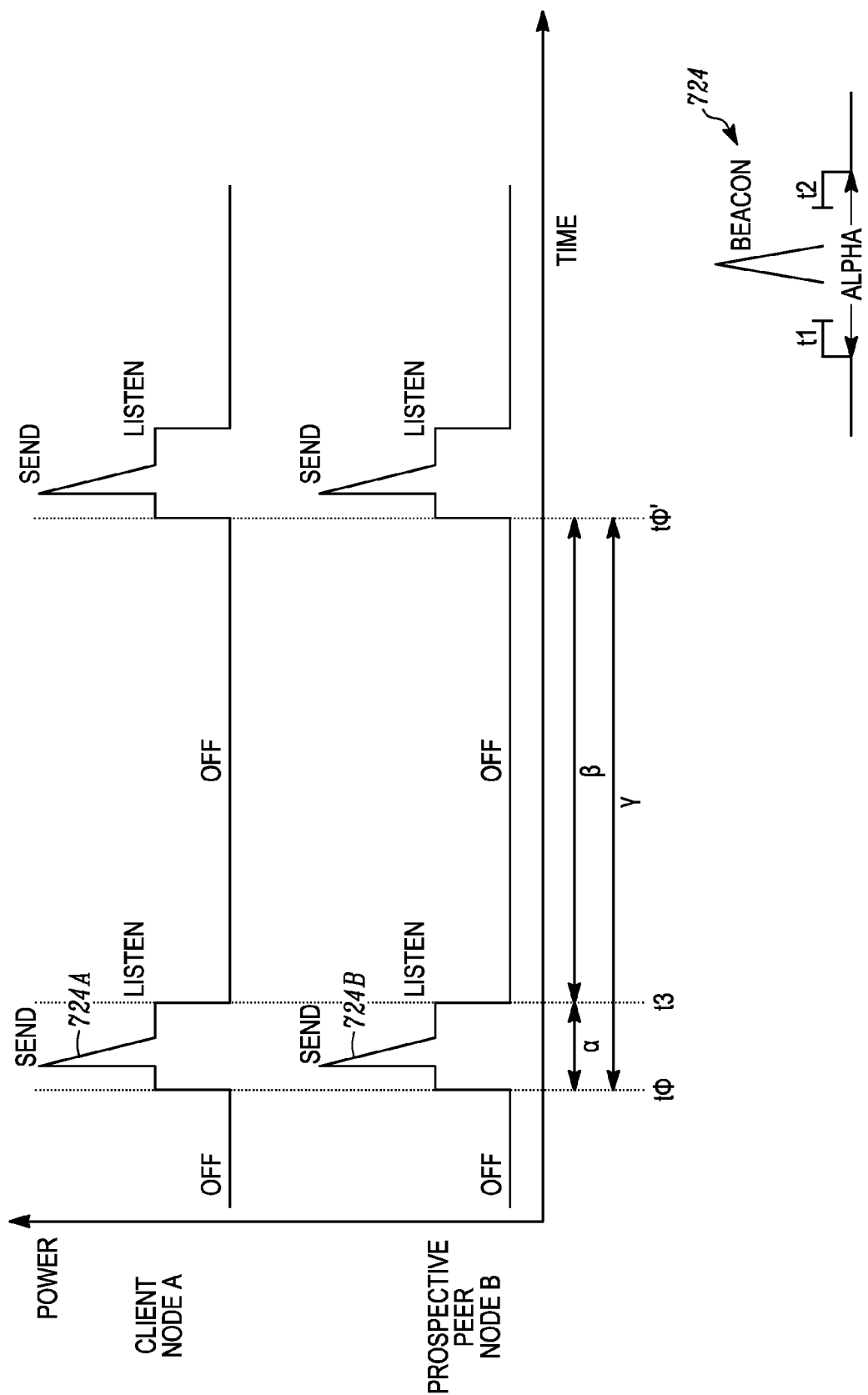
FIG. 7 is a timing diagram demonstrating time synchronization of nodes in the ad hoc network in accordance with one exemplary implementation of some embodiments of the present invention.

FIG. 7 is a timing diagram demonstrating time synchronization of nodes in the ad hoc network in accordance with one exemplary implementation of some embodiments of the present invention. In this embodiment, each of the nodes participates in a time-synchronized discovery protocol.

As shown in FIG. 7, a client node A and prospective peer node B are time synchronized. The nodes in the ad hoc network can use their cellular interface, for example, to synchronize the sending and listening processes of the sending and receiving nodes in a particular transaction. As such, the timing of the time intervals or periods $\alpha$, $\beta$ and Y coincide at each node. For example, each node turns its ad hoc interface "on" at the beginning of a time period ($\alpha$), stays "on" during the time period ($\alpha$), and then turns "off" for a time period ($\beta$). During that "on" time period ($\alpha$), communications related to discovery, such as listening, sending and receiving packets, occur. However, the precise time interval at which the beacon 724 A,B is transmitted is random within the time interval (t1, t2) within time period ($\alpha$).

Both the client node A and the prospective peer node B keep their ad hoc interfaces on for a relatively short time period ($\alpha$) between t0 and t3 during which they send beacons 724A, B and listen for response beacons from other node(s), and then turn their ad hoc interfaces off for a time period ($\beta$) between t3 and t0'. The sum of time periods ($\alpha+\beta$) is equal to the time period (Y), and the time periods (Y) for both the client node A and the prospective peer node B are substantially synchronized in time. For example, at both the client node A and the prospective peer node B, the leading edge (t0) of time period ($\alpha$) where the ad hoc interface turns on, and the falling edge (t3) of time period ($\alpha$) where the ad hoc interface turns off, both occur at substantially the same time. Similarly, at both the client node A and the prospective peer node B, the time periods ($\beta$) where the ad hoc interface turns off (between t3 and t0') both occur at substantially the same time.

The sub-graph 720 shows a timeline (t1,t2) within the time period ($\alpha$) during which the beacon 724A can be positioned. The particular location for the beacon within the time period ($\alpha$) can vary between the times t1 and t2. This is done to provide a compensation window that allows for the different nodes to account for drift in the synchronization between those nodes and thereby provide a sufficient overlap between the beacons of different synchronized nodes when the node's clocks drift slightly apart from one another. The precise timing of the beacon can be randomly chosen anywhere between the interval t1 to t2. Randomly choosing the location of the beacon reduces the amount of contention on the channel.

In this embodiment, each node follows the following protocol. At time t0, the node turns its ad hoc interface "on" and starts listening for beacons. Time t0 is determined by the universal time synchronization constant. For example, t0 could be every 0-th second and every 30-th second when the time period (Y) is one minute. The time period (Y) is the time period between t0, t0'. If the node wants to send a beacon the node computes a time X at which it will send the beacon. The time X is computed to be a random time in the interval (t1, t2). The randomization is optional and can be implemented to avoid collision. Times t1 and t2 can be selected such that t1−t0>"maximum time drift", t3−t2>"maximum time drift" and t1−t0=t3−t2. The selection of the time interval (t1, t2) is designed in order to account for the maximum time drift between two nodes. This guarantees that every node will be listening during the time when another node will be sending its beacon. At time t3, each node turns its ad hoc interface "off." If a node is not interested in receiving beacons but just sending beacons, then the node can further save energy by staying "off" for the duration of (t0, t1) and then staying "on" for some short interval so that a beacon response can be received. Using this protocol, the energy conservation is proportional to the percentage of time the node is in state "off". The longer the node remains "off", the higher the energy saving will be. On average, the time to discover existing peers is measured by (Y−$\alpha$)/2. Moreover, the node knows the next time t0 at which another discovery might be possible and this information can be passed to the upper layer applications.

Thus, by time synchronizing the nodes, every node in the ad hoc network can effectively use a TDM-like protocol in which they send their beacons within a specific time slot that is common to all of the nodes that belong to that particular network. The various nodes in the ad hoc network can then use this time synchronization to agree in advance on particular time period or interval ($\alpha$) during which those nodes will be listening or idle and transmitting their beacon message, and also agree on the particular time period or interval ($\beta$) during which those nodes will be completely off. This can reduce energy consumption of the nodes since they will only need to keep their ad hoc interface "on" for a predetermined period or interval ($\alpha$). This way, if other nodes are in proximity (e.g., transmission range) of a node, then that node should always be able to detect a beacon within a very, very short interval in comparison to a situation where the nodes are not synchronized.

Figure 8:
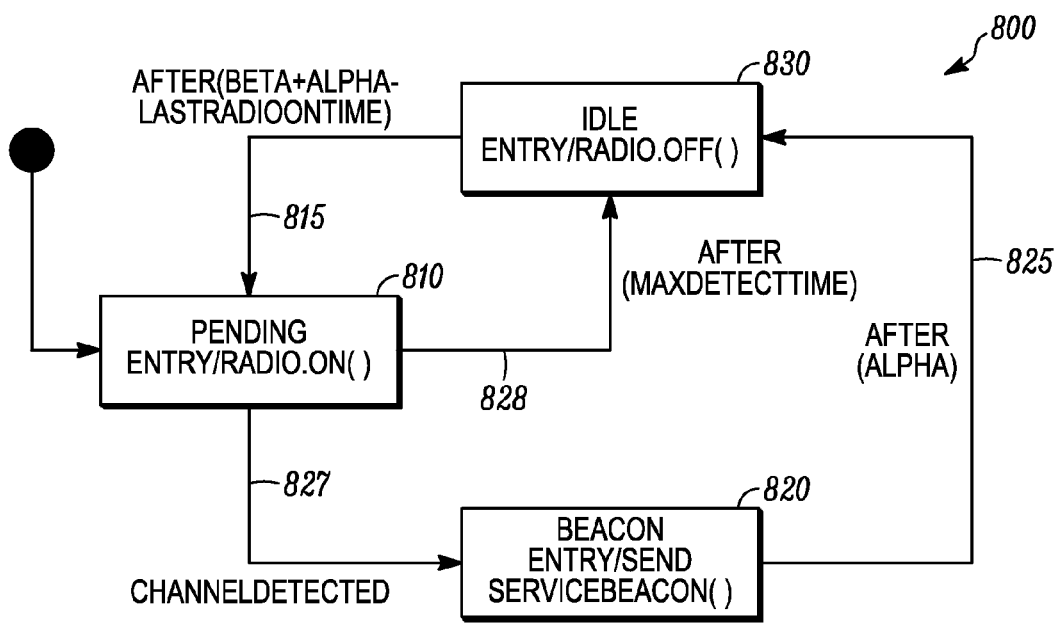
FIG. 8 is a Unified Modeling Language (UML) state diagram showing a continuous beacon sender process in accordance with some embodiments of the invention.
Figure 9:
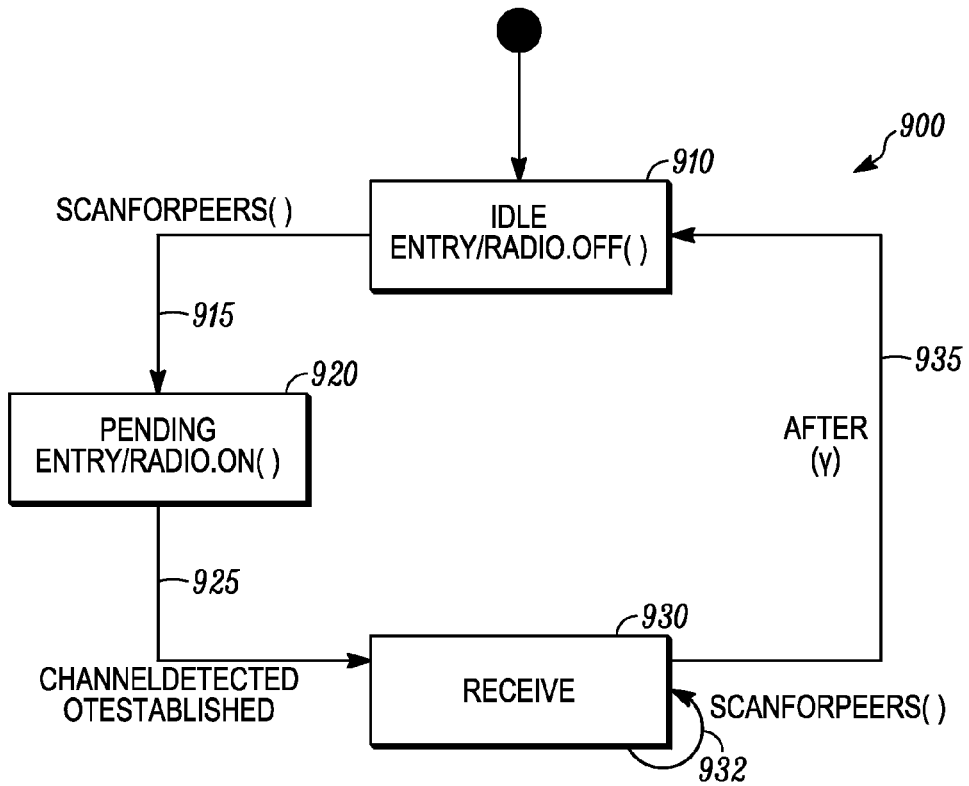
FIG. 9 is a UML state diagram showing an application-driven beacon receiver process in accordance with some embodiments of the invention.
Figure 10:
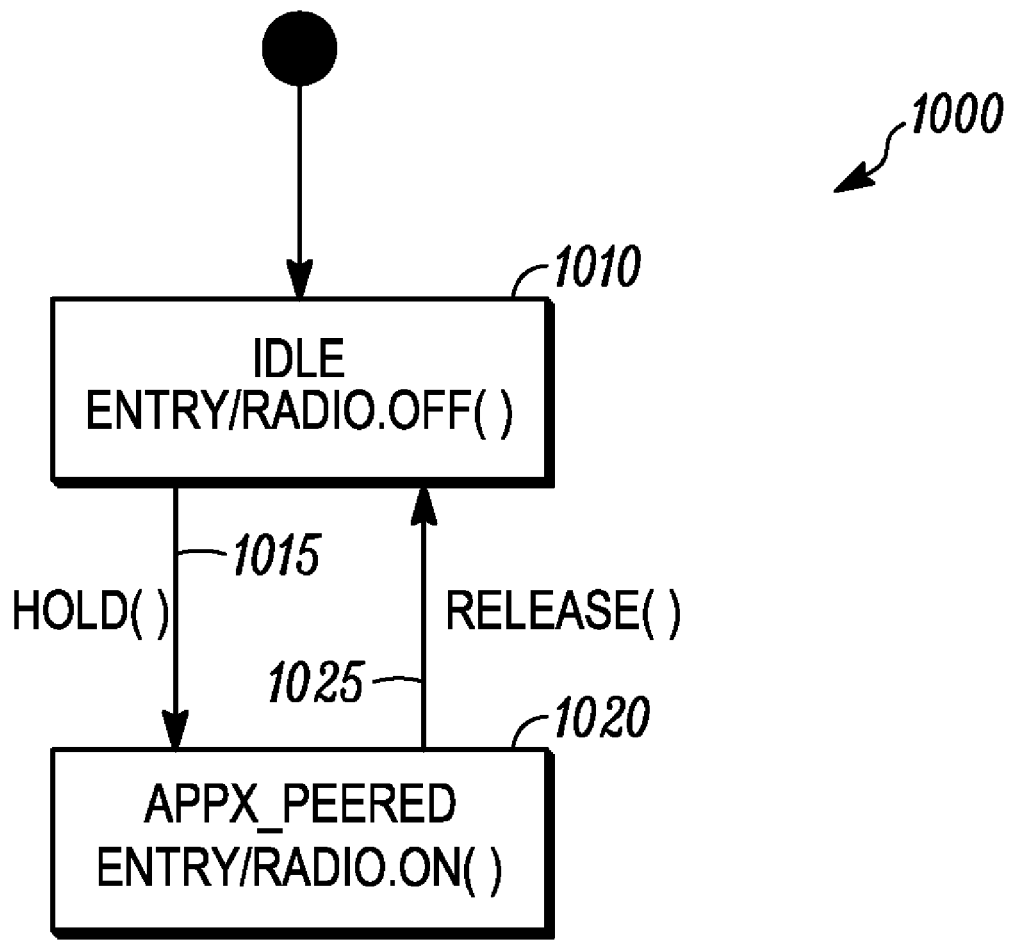
FIG. 10 is a UML state diagram showing an application-level peering process in accordance with some embodiments of the invention.

FIGS. 8-10 are Unified Modeling Language (UML) state diagrams showing various process which can be employed by each of the nodes in an ad hoc network. Each of the nodes in the autonomous ad hoc network can employ a continuous beacon sender process 800 (FIG. 8), an application-driven beacon receiver process 900 (FIG. 9), and an application-level peering processes 1000 for communication (FIG. 10). In other words, any particular node could be running one, two or three of the state machines shown in FIGS. 8-10 at any particular time. It is possible that multiple copies of process 900 and process 1000 could run concurrently whenever multiple applications have concurrent requests for peering. These processes are shown with UML for ease of understanding. In FIGS. 8-10, the Radio.off( ) state is paired to the Radio.on( ) state on a per state diagram basis. The target state of the radio hardware is the logical "OR" of all possible holders of the Radio singleton object. An appropriate API to set service advertisement payload is assumed.

FIG. 8 is a Unified Modeling Language (UML) state diagram showing a continuous beacon sender process 800 in accordance with some embodiments of the invention. The continuous beacon sender process 800 is run by every node belonging to a particular network. FIG. 8 shows what nodes are doing when they are merely advertising their own services in a low power mode. According to the rules of this state transition diagram 800, even if the node currently has no services running they will ultimately be sending a beacon at state 820 to advertise what services they are currently offering which could be none.

The continuous beacon sender process 800 comprises a number of states 810-830 and a number of arcs 815, 825, 827, 828 between those states 810-830. Arcs between the different states 810 through 830 can be read either as the expiration of a timer or a signal that has been detected by the engine that is running or processing the state machine 800.

During a pending entry/Radio.on( ) state 810 the ad hoc interface of the node enters an "on" state and is turned on. The channelDetected arc 827 is a signal from the hardware (or ad hoc device driver) which asserts the presence of an RF level beacon. The after (maxDetectTime) arc 828 is the per hardware time to discover an RF level beacon on the current channel. This represents the maximum time the node will look for another beacon on the same channel from another node.

During a beacon entry/sendServiceBeacon( ) state 820, the ad hoc interface of the node enters a "beacon" state and sends a service beacon. The after($\alpha$) arc 825 is a timer waiting for a timeout related to the alpha value.

During the idle entry/Radio.off( ) state 830, the ad hoc interface of the node enters an "idle" state and is turned off. The after($\beta+\alpha$-lastRadioOnTime) arc 815 represents the behavior of each node in the population of nodes when those nodes have nothing else to do. lastRadioOnTime is for synchronization to the last beacon sent by this unit (or could alternatively be used to synchronize the entire population).

FIG. 9 is a UML state diagram showing an application-driven beacon receiver process 900 in accordance with some embodiments of the invention. The application-driven beacon receiver process 900 is run whenever an application has some activity and wants to communicate with one of its neighbor nodes.

The application-driven beacon receiver process 900 comprises a number of states 910-930 and a number of arcs 915, 925, 932, 935 between those states 910-930.

The states 910-930 include an idle entry/Radio.off( ) state 910 during which the ad hoc interface is turned off. During the pending entry/Radio.on( ) state 920 the ad hoc interface is turned on. The scanForPeers( ) arc 915 initiates a Y cycle during which the particular node will scan for peers by turning the ad hoc interface on at pending entry/Radio.on( ) state 920, and then, as indicated by arc 925, attempting to detect or establish a channel. The scanForPeers( ) is a function API exposed to the higher layer which can be implemented as sync (with sync callback on caller's frame), deferred sync (as was done via future object style with jSIP) or async (standard listener model of Java). The channelDetectedOrEstablished arc 925 is a signal from the hardware which asserts the presence of an RF level beacon (seen or created).

During a receive state 930, the node listens for beacons from peer nodes and continues to receive those and to determine whether or not one of those peer nodes is offering (or is capable of offering) a service which the node would like to receive Once in the receive state 930, the node attempts to receive, and as indicated by scanForPeers( ) arc 932, this process continues until the node receives a response from at least one other node. After(Y) 935, the ad hoc interface of the node returns to state 910 where the ad hoc interface is turned off.

Thus, a node typically stays in the idle state 910 unless the application wants to looks for nodes in its transmission range, at which point the node transitions to radio on state 920 where the radio is turned on to scan for peers per arc 932.

FIG. 10 is a UML state diagram showing an application-level peering process 1000 in accordance with some embodiments of the invention. The application-level peering process 1000 is instantiated on a per application basis and is driven by application requirements.

At idle entry state/Radio.off( ) 1010 the node is in an idle state where the ad hoc interface is off. From state 1010, the node can For example, when there is a prospective peer node that a client node would like to communicate with, the hold( ) function ensures that the ad hoc interface is left on for the time that the application remains in a servicing mode (e.g., the time during which it is trying to service requests from another party). Once all the requests have been satisfied or taken away at appX_peered entry/Radio.on( ) state 1020, the application calls a release function at arc 1025 allows the hold 1015 to be turned off, and the node reenters an idle state 1010 in which the ad hoc interface is turned off.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that can cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for a client node to discover a peer provider node in an ad hoc network, comprising:

activating a first ad hoc interface in the client node while in a discovery mode to establish a channel for a first time period;

transmitting a first beacon to advertise presence of the client node including a request to acquire service information from at least one prospective peer provider node within the transmission range of the client node;

receiving, during the first time period at the client node, a second beacon from the at least one prospective peer provider node;

analyzing information in the second beacon to determine if the at least one prospective peer provider node offers the service the client node is requesting; and transmitting a response message from the client node to the at least one prospective peer provider node when the at least one prospective peer provider node offers the service requested by the client node, wherein the response message indicates that the at least one prospective peer provider node is to keep a second ad hoc interface active for a period of time.

2. A method according to claim 1, further comprising:
activating the second ad hoc interface in the at least one prospective peer provider node for a second period of time to listen for beacons from other nodes, wherein the second period of time is less than or equal to the first period of time; and
transmitting the second beacon from the at least one prospective peer provider node at the beginning of the second period of time to advertise services which the at least one of the plurality of prospective peer provider node can provide to other nodes,
wherein the second beacon comprises a service extension field comprising a list of services that are currently running on the at least one prospective peer provider node or that the at least one prospective peer provider node is capable of running.

3. A method according to claim 2, wherein the second ad hoc interface is activated in response to either:
receiving another beacon, or
at regular predetermined time intervals.

4. A method according to claim 1, wherein the first beacon comprises:
a first field indicating the first period of time the client node will keep the channel on for, and
a second field indicating a service the client node is requesting,
wherein the first time period is of sufficient duration to ensure that a prospective peer provider node within the transmission range of the client node can detect and respond to the first beacon, and
wherein the first time period is of sufficient duration to ensure that, if a response beacon is transmitted by a prospective peer provider node, the client node will detect a response beacon within the first time period.

5. A method according to claim 1, wherein the second beacon further comprises:
a first field specifying a duration of the second time period ($\alpha$) during which the second ad hoc interface will be on and a duration of the third time period ($\beta$) during which the second ad hoc interface will be off;
a MAC beacon field which specifies the IEEE 802.11 MAC beacon;
an IP extension field which specifies the IP address of the particular node that is transmitting the second beacon; and
a second field comprising a number of neighbor nodes a particular prospective peer provider node has seen recently within a particular time period.

6. A method according to claim 5, further comprising:
receiving a second beacon from a first prospective peer provider node;
receiving a second beacon from a second prospective peer provider node;
evaluating each of the second beacons; and
choosing either the first prospective peer provider node or the second prospective peer provider node based on the fields specified in each of the second beacons.

7. A method according to claim 5, wherein a duration of the second time period ($\alpha$) and a duration of the third time period ($\beta$) define a duty cycle for the particular node.

8. A method according to claim 5, further comprising:
determining, at each prospective peer provider node, a duration of the second time period ($\alpha$) and a duration of the third time period ($\beta$) based on the particular service(s) being offered by the particular prospective peer provider node.

9. A method according to claim 8, wherein the duration of the second time period ($\alpha$) can be adjusted based on the particular radio protocol being used, and
wherein the duration of the third time period ($\beta$) can be adjusted based on the real time requirements of the particular service(s) being offered by the particular node.

10. A method according to claim 5, wherein a sum of the second time period ($\alpha$) and the third time period ($\beta$) is less than or equal to the value of the first time period ($Y_{max}$) on all nodes.

11. A method according to claim 1, wherein the first beacon comprises a first application service beacon and the second beacon comprises a second application service beacon.

12. A method according to claim 1, wherein the beginning of the first time period is synchronized with the beginning of the second time period based on a time constant provided from a cellular network or service.

13. A method according to claim 12, wherein the end of the first time period is synchronized with the end of the second time period based on a time constant provided from a cellular network or service.

14. A method according to claim 1, wherein the client node turns off the first ad hoc interface and enters sleep mode when it does not receive a response from a prospective peer provider node within the first time period.

15. A method according to claim 1, further comprising:
communicating, between the client node and the at least one prospective peer provider node, information associated with the service requested by the client node; and
turning off the second ad hoc interface once the at least one prospective peer provider node has communicated the information associated with the service requested by the client node.

16. A method according to claim 1, wherein the prospective peer provider nodes not receiving a response message from the client node turn off their second ad hoc interfaces at the end of the second time period.

17. An ad hoc network, comprising:
at least one prospective peer provider node; and
a client node configured to:
turn on a first ad hoc interface in the client node while in a discovery mode to establish a channel for a first time period;
transmit a first beacon to advertise presence of the client node including a request to acquire service information from at least one prospective peer provider node within the transmission range of the client node;
receive, during the first time period at the client node, a second beacon from the at least one prospective peer provider node;
analyze information in the second beacon to determine if the at least one prospective peer provider node offers the service the client node is requesting; and
transmit a response message from the client node to the at least one prospective peer provider node when the at least one prospective peer provider node offers the service requested by the client node,
wherein the response message indicates that the at least one prospective peer provider node is to keep a second ad hoc interface active for a period of time.

18. An ad hoc network according to claim 17, wherein the at least one of the prospective peer provider nodes is configured to:

activate the second ad hoc interface in the at least one of the prospective peer provider nodes for a second period of time to listen for beacons from other nodes, wherein the second period of time is less than or equal to the first period of time; and transmit the second beacon during the second period of time to advertise services the prospective peer provider node can provide to other nodes wherein the second beacon comprises a service extension field comprising a list of services that are currently running on the prospective peer provider node or that the prospective peer provider node is capable of running.

19. An ad hoc network according to claim 17, wherein the first beacon comprises:

a first field indicating the first period of time the client node will keep the channel on for, and a second field indicating a service the client node is requesting, wherein the first time period is of sufficient duration to ensure that a prospective peer provider node within the transmission range of the client node can detect and respond to the first beacon, and wherein the first time period is of sufficient duration to ensure that, if a response beacon is transmitted by a prospective peer provider node, the client node will detect a response beacon within the first time period.

20. An ad hoc network according to claim 17, wherein the second beacon further comprises:

a first field specifying a duration of the second time period ($\alpha$) during which the second ad hoc interface will be on and a duration of the third time period ($\beta$) during which the second ad hoc interface will be off;

a MAC beacon field which specifies the IEEE 802.11 MAC beacon;

an IP extension field which specifies the IP address of the particular node that is transmitting the second beacon; and a second field comprising a number of neighbor nodes a particular prospective peer provider node has seen recently within a particular time period.

21. An ad hoc network according to claim 20, wherein the client node is further configured to:

receive a second beacon from a first prospective peer provider node;

receive a second beacon from a second prospective peer provider node;

evaluate each of the second beacons, and choose either the first prospective peer provider node or the second prospective peer provider node based on the fields specified in each of the second beacons.

22. An ad hoc network according to claim 20, wherein a duration of the second time period ($\alpha$) and a duration of the third time period ($\beta$) define a duty cycle for the particular node.

23. An ad hoc network according to claim 20, wherein each of the prospective peer provider nodes is configured to determine a duration of the second time period ($\alpha$) and a duration of the third time period ($\beta$) based on the particular service(s) being offered by the particular prospective peer provider node.

24. An ad hoc network according to claim 23, wherein the duration of the second time period ($\alpha$) can be adjusted based on the particular radio protocol being used, and wherein the duration of the third time period ($\beta$) can be adjusted based on the real time requirements of the particular service(s) being offered by the particular node.

25. An ad hoc network according to claim 20, wherein a sum of the second time period ($\alpha$) and the third time period ($\beta$) is less than or equal to the value of the first time period ($Y_{max}$) on all nodes.

26. An ad hoc network according to claim 17, wherein the first beacon comprises a first application service beacon and the second beacon comprises a second application service beacon.

27. An ad hoc network according to claim 17, wherein the beginning of the first time period is synchronized with the beginning of the second time period based on a time constant provided from a cellular network or service.

28. An ad hoc network according to claim 27, wherein the end of the first time period is synchronized with the end of the second time period based on a time constant provided from a cellular network or service.

29. An ad hoc network according to claim 17, wherein the second ad hoc interface is activated in response to either:

receiving another beacon, or at regular predetermined time intervals.

30. An ad hoc network according to claim 17, wherein the client node turns off the first ad hoc interface and enters sleep mode when it does not receive a response beacon from a prospective peer provider node within the first time period.

31. An ad hoc network according to claim 17, wherein the at least one prospective peer provider node is configured to communicate information associated with the service requested by the client node, and to turn off the second ad hoc interface once the at least one prospective peer provider node has communicated the information associated with the service requested by the client node.

32. An ad hoc network according to claim 17, wherein the prospective peer provider nodes not receiving a response message from the client node turn off their second ad hoc interfaces at the end of the second time period.

* * * * *

UNITED STATES PATENT AND TRADEMARK OFFICE
CERTIFICATE OF CORRECTION

PATENT NO. : 7,613,156 B2
APPLICATION NO. : 11/422954
DATED : November 3, 2009
INVENTOR(S) : Rittle et al.

It is certified that error appears in the above-identified patent and that said Letters Patent is hereby corrected as shown below:

IN THE DRAWINGS

In Fig. 7, Sheet 6 of 8, delete "tϕ" and insert -- t0 --, therefor.

In Fig. 7, Sheet 6 of 8, delete "tϕ'" and insert -- t0' --, therefor.

In Fig. 9, sheet 7 of 8, below Arc "925", Line 2, delete "OTESTABLISHED" and insert -- OR ESTABLISHED --, therefor.

Signed and Sealed this
Thirteenth Day of September, 2011

David J. Kappos
*Director of the United States Patent and Trademark Office*